No. 12,494.

REISSUED JUNE 12, 1906.

H. B. BARTLETT.

LINOTYPE MACHINE.

APPLICATION FILED APR. 15, 1905.

6 SHEETS—SHEET 1.

Witnesses
H. M. Gillman, Jr.
Arthur L. Bryant

Inventor
Henry B. Bartlett
By Foster Freeman & Watson
Attorneys

No. 12,494. REISSUED JUNE 12, 1906.

H. B. BARTLETT.

LINOTYPE MACHINE.

APPLICATION FILED APR. 15, 1905.

6 SHEETS—SHEET 2.

Witnesses.

H. M. Gillman Jr.

Arthur L. Bryant

Inventor

Henry B. Bartlett

By Foster Freeman & Watson

Attorneys

No. 12,494. REISSUED JUNE 12, 1906.

H. B. BARTLETT.

LINOTYPE MACHINE.

APPLICATION FILED APR. 15, 1905.

6 SHEETS—SHEET 3.

Witnesses

Wm. Gilman, Jr.

Arthur L. Bryant

Inventor

Henry B. Bartlett

By Foster Freeman & Watson

Attorneys

No. 12,494. REISSUED JUNE 12, 1906.

H. B. BARTLETT.

LINOTYPE MACHINE.

APPLICATION FILED APR. 15, 1905.

6 SHEETS—SHEET 4.

Witnesses
H. M. Gillman Jr.
Arthur L. Bryant

Inventor
Henry B. Bartlett
By Foster Freeman & Watson
Attorneys

No. 12,494. REISSUED JUNE 12, 1906.

H. B. BARTLETT.

LINOTYPE MACHINE.

APPLICATION FILED APR. 15, 1905.

6 SHEETS—SHEET 5.

Witnesses

Hm Gillman Jr

Arthur L. Bryant

Inventor

Henry B. Bartlett

By Foster Freeman & Watson

Attorneys

No. 12,494. REISSUED JUNE 12, 1906.

H. B. BARTLETT.

LINOTYPE MACHINE.

APPLICATION FILED APR. 15, 1905.

6 SHEETS—SHEET 6.

Witnesses

Inventor

Henry B. Bartlett

By Foster Freeman & Watson

Attorneys

UNITED STATES PATENT OFFICE.

HENRY B. BARTLETT, OF NEW YORK, N. Y., ASSIGNOR TO MERGENTHALER LINOTYPE COMPANY, A CORPORATION OF NEW YORK.

LINOTYPE-MACHINE.

No. 12,494. Specification of Reissued Letters Patent. Reissued June 12, 1906.

Original No. 741,294, dated October 13, 1903. Application for reissue filed April 15, 1905. Serial No. 255,854.

*To all whom it may concern:*

Be it known that I, HENRY B. BARTLETT, a citizen of the United States, residing in the city, county, and State of New York, and formerly a resident of Berlin, Germany, have invented certain new and useful Improvements in Linotype-Machines, of which the following is a specification.

My invention relates to improvements in the assembling and distributing devices of linotype-machines; and the object of the invention is to provide a simple distributing mechanism adapted to distribute matrices into a plurality of magazines and simple assembling devices adapted to release matrices from a plurality of magazines and deliver them to a common place of assemblage.

The invention will be described in detail in connection with the accompanying drawings, in which—

Figure 1:
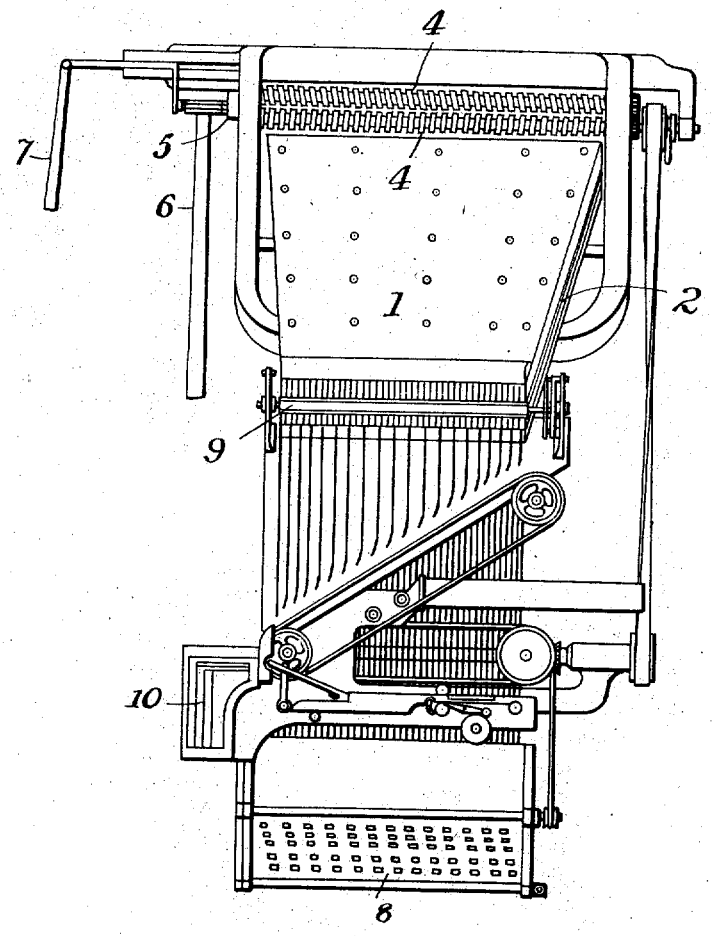
Figure 2:
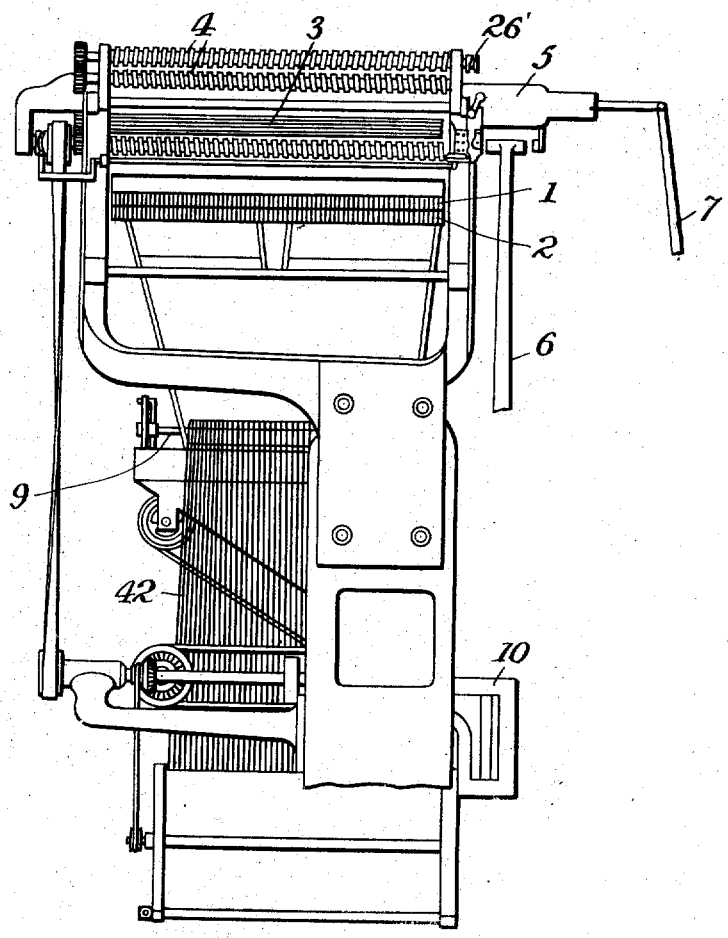
Figure 3:
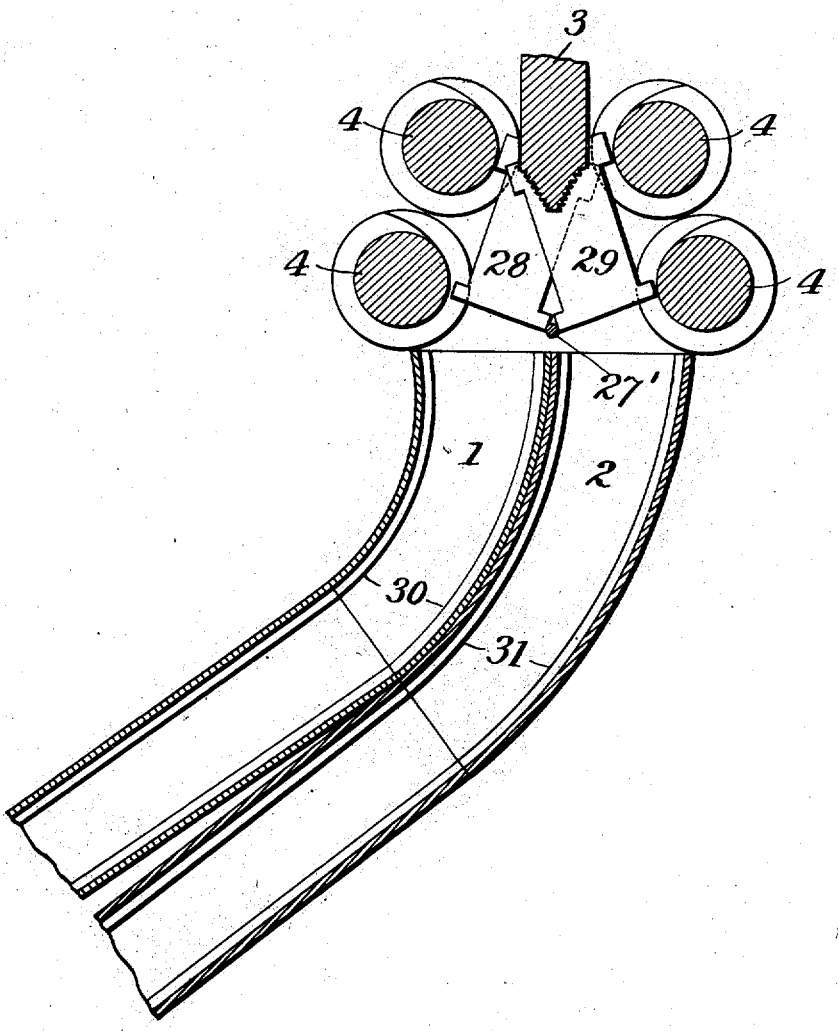
Figure 4:
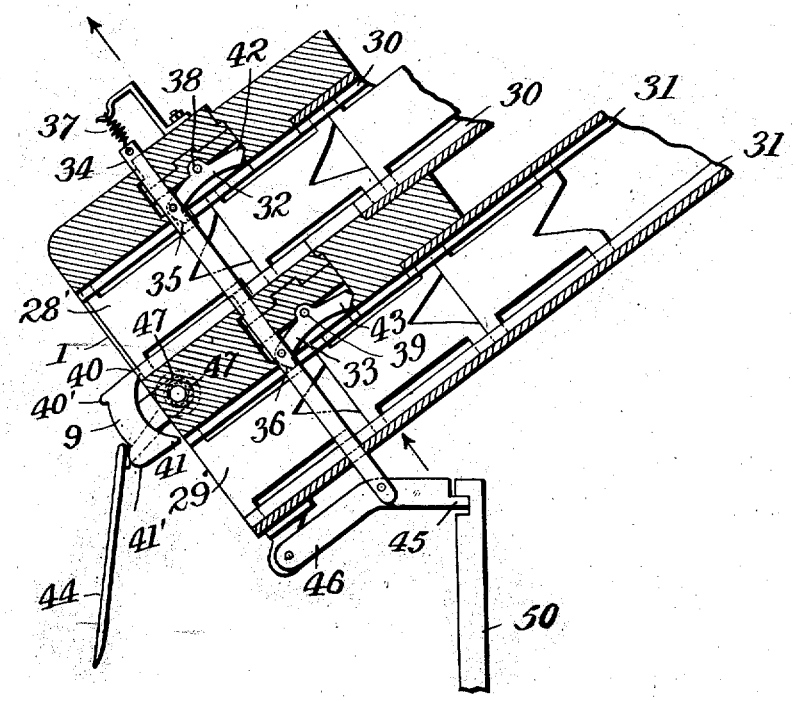
Figure 5:
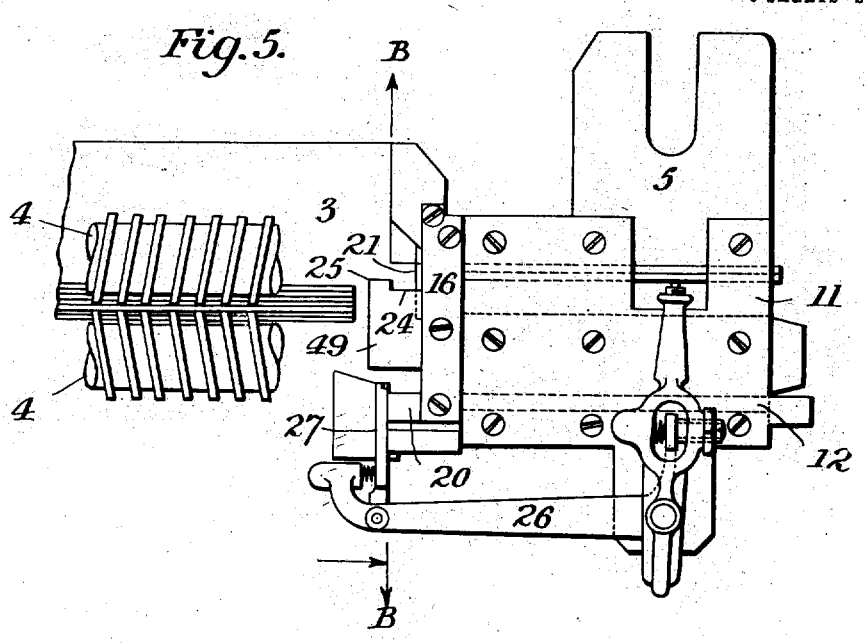
Figure 7:
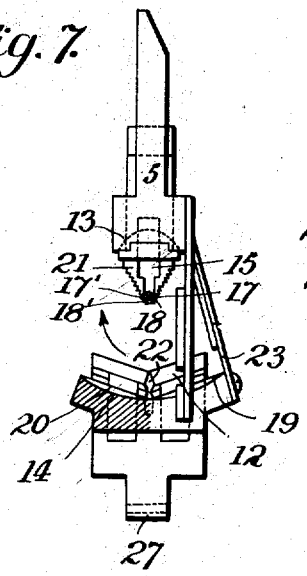
Figure 6:
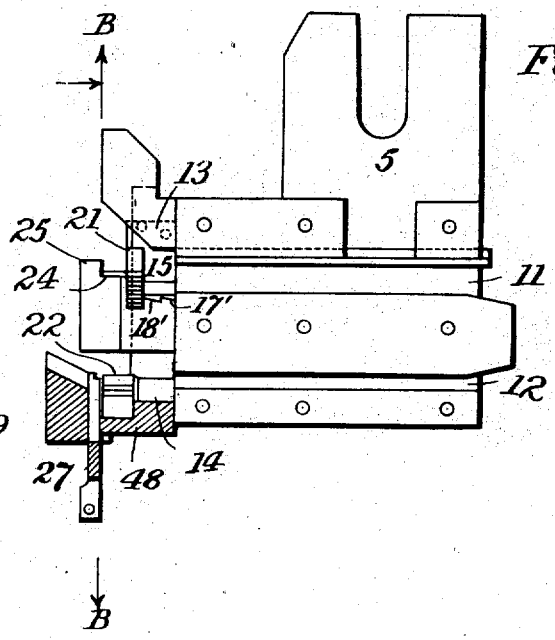
Figure 8:
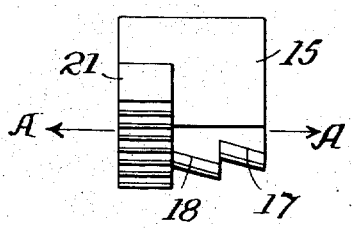
Figure 9:
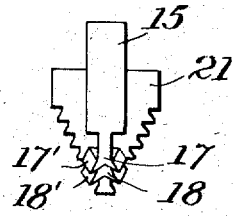
Figure 11:
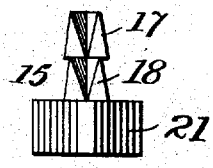
Figure 10:
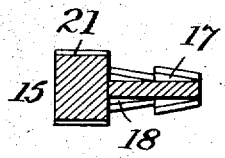
Figure 12:
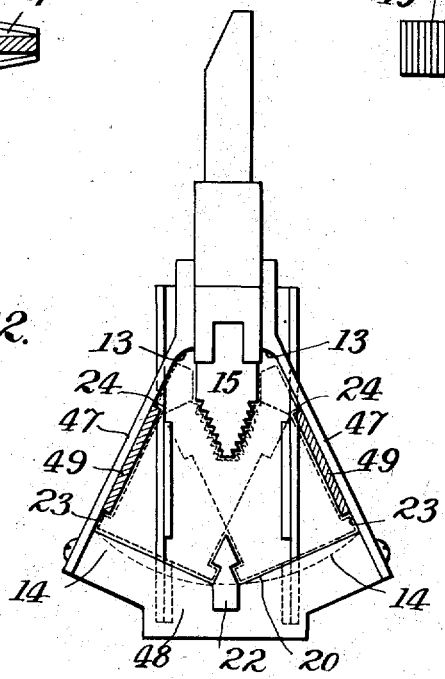

Figure 1 is a partial front elevation of a linotype-machine provided with two magazines. Fig. 2 is a rear view of the same. Fig. 3 is a cross-section through the distributing-rail, distributing-screws, and the magazine-mouths. Fig. 4 is a similar cross-section taken through the lower ends of the magazines and illustrating the escapement devices. Fig. 5 is a side elevation of the distributing-box and the devices for turning the matrices. Fig. 6 is a longitudinal section, and Fig. 7 a rear view, of the parts shown in Fig. 5; Fig. 8, a part of the matrix-turning device in side elevation. Fig. 9 is a front view of the same. Fig. 10 is a section on the line A A of Fig. 8. Fig. 11 is a bottom view of the part illustrated in Figs. 8 and 9, and Fig. 12 is a front view of the turning device looking from the line B B of Fig. 5.

Referring to the drawings, 1 and 2 indicate two linotype-magazines having their entrance ends parallel and adjacent and their outlet or delivery ends also parallel and adjacent; 3, a distributing-rail common to said magazines; 4, the distributing-screws; 5, the distributing-box; 6, the elevator for conveying the matrices from the lower station 10 to the distributing-box, and 9 the matrix-locking device, which is adapted to prevent discharge of matrices from either magazine and also to raise the matrices in either magazine to relieve the pressure of the matrices upon their escapements, as will be hereinafter more particularly pointed out.

The matrices are discharged from the elevator into the distributing-box 5 in the usual manner. They are of the usual form, with the exception that the V-shaped notches which engage the distributer-rail are eccentric—that is, the axis of the V-notch in a matrix designed for one magazine is inclined to the right and the axis of the notch in a matrix designed for the other magazine is inclined to the left. The matrices hang from the common rail, as shown in Fig. 3. In this manner twice as many matrices may be distributed by a single rail as heretofore. The means for inclining the matrices to the right or left and engaging them with the distributing-rail will now be described.

Referring to Figs. 5 and 6, the matrices enter the distributing-box at the right, their upper and lower ears engaging, respectively, with the grooves 11 and 12 in the sides of the box. After passing the grooves 11 and 12 the matrices encounter a turning device 17 17′ and farther on a similar device 18 18′. These turning devices are inclined rearwardly and upwardly. They enter the V-notches in the matrices and swing them to the right or left, according to the eccentricity of the notches. To permit the swinging movement of the matrices, the channel or floor 14 beneath the turning devices is curved.

After passing the turning devices the V-notches of the matrices engage with a short section of toothed rail 21, supported by a rib 15, and beneath this toothed rail are inclined surfaces 19 and 20, upon which the lower ends of the matrices travel, said lower ends being separated and guided by a guide 22. While the matrices are passing the guide 21 their outer lower lugs are guided in grooves 23 below plates 49, which are carried by side pieces 47, Fig. 12. The upper edges 24 of the guide-plates 49 have upward projections 25, which serve as stops to hold the matrices in register with the separating device 27, which carries them singly up to the distributer-rail 3. The separating elevator or pusher 27 is operated by a lever 26 and a cam 26′, Figs. 2 and 5, in the usual manner. The plates 47 where they join the rib 15 are arched, as at 13, and at their lower ends they are securely connected by a bridge-piece 48, Fig. 12. The elevator 27 has reversely-inclined upper surfaces adapted to engage the inclined bottom surfaces of the two classes of matrices, as shown in Fig. 7. The matrices are lifted by the elevator into engagement with the distributing-screws 4 and by said screws carried onto and along the main rail 3. The lower ends of the matrices are separated and guided during distribution by a guide 27′, which, as shown, is a wire located above the division between the two magazines and centrally below the distributing-rail 3. The magazines are provided with channels 30 and 31 of the usual construction.

The lower ends of the magazines are illustrated in section in Fig. 4, referring to which 42 43 indicate the upper ends of two escape-pawls 32 33, pivoted, respectively, at 38 and 39. 35 36 indicate the lower hooked ends of the said pawls, which are adapted to engage the upper lugs of the lowermost matrices, and thus sustain the matrices in the magazines. The pawls are operated simultaneously by connecting-bars 34, which are normally pulled in the direction of the arrows, Fig. 4, by springs 37 and which may be operated in the opposite direction by rods 50, operated from the keyboard 8. The rods 50 engage with projecting ends 45 of levers 46, to which the reciprocating bars 34 are connected.

The arrangement of pawls and operating mechanism described would release two matrices each time a common rod 50 is operated. It is desirable to release but a single matrix at a time, and hence I provide means for retaining the matrices in either magazine, as desired, while the matrices of the other magazine are free to be discharged. As shown, this is accomplished by means of the bar 9, which is pivotally connected to the lower ends of the magazine at 47 and extends transversely across the magazine-exits. The bar 9 has a rib or edge 40, which is adapted to engage the lowest matrices in the channels of the magazine 1 and move them backward and hold them stationary, thus releasing the pawl 32 from the weight of the matrices and preventing any matrices from being discharged from the magazine 1. On operating the escapement-rod 50 the pawl 33 will release matrices in the ordinary manner, while the pawl 32 will play idly in its recess. On the other hand, if the rod 9 be rocked in the other direction its lower rib or edge 41 will enter the magazine 2, while the rib or edge 40 will be withdrawn from the magazine 1, thus rendering the former magazine inoperative and the latter operative. A guide-plate 44 is provided for guiding the matrices from the upper magazine 1 to the assembler. This plate 44 is pivotally mounted at 47 by means of arms, one of which is shown in dotted lines, Fig. 4. The bar 9 is provided with a rib 40′, which engages the upper edge of the plate 44 when the upper magazine 1 is operative, in which case the edge of the bar 9 and the plate 44 together form a chute over which the matrices from the upper magazine travel. When the lower magazine is operative, a lower rib 41′ on the bar 9 engages with the plate 44 and rocks it upward, as shown in Fig. 4, so that it will not obstruct the passage of matrices from the lower magazine.

The operation of the invention may be briefly described as follows: The matrices are delivered from the elevator 6 to the distributing-box in a solid line, in which the lugs of all the matrices are alined and travel in the grooves 11 12. The matrices then encounter the turning devices 17 18, and they are turned either to the right or left, according to the inclination or eccentricity of the axes of their V-notches. The matrices then assume the relative positions shown in Fig. 12, and their lower ends travel on opposite sides of the center guide 22. In these positions the matrices pass the rail 21, which rail places the V-notches in perfect alinement. After passing the rail 21 the matrices are engaged one at a time and raised by the elevator-slide 27 into register with the inward end of the distributing-rail 3. They are thus engaged with the screws 4, which are constantly rotating and which carry the matrices into engagement with the rail 3 and along said rail to their appropriate magazine-channels in the usual manner. The lower inner ears of the matrices rest upon and are guided by the rod or wire 27′ in traveling over the magazines, as shown in Fig. 3. As each matrix reaches its home channel it is released from the rail and drops in in the well-known manner. By means of the bar 9 either magazine may be rendered inoperative at will. When a magazine is rendered inoperative, its matrices are sustained by the bar 9 and its detents play idly without releasing the matrices. But one matrix may thus be discharged at a time, and the escapement mechanism runs as lightly as though only a single magazine were used. This arrangement of escapement devices may be used for delivering upper and lower case matrices, for instance, in which event the bar 9 would correspond to the "case-key" of a type-writer or other typographic machine, which is used to change from one case to another. It will be noted that the escapement-connecting rods 34 pass through the magazine-walls between the channels and above the lower ends thereof.

I believe myself to be the first to provide a plurality of magazines having their entrance ends parallel and adjacent, with a common distributing-rail and with matrices adapted to be carried by said rail and discharged into the different magazines. I also believe myself to be the first to provide several series of matrices having distributing-notches differently arranged in the different series in combination with means for alining the notches and charging the matrices onto a common distributing-rail. The particular matrices illustrated in this application are more fully described in Letters Patent No. 719,296, issued to me January 27, 1903. I also believe myself to be the first to provide a series of magazines arranged side by side and having their corresponding escapements connected by rods or bars extending through the magazines.

Having described my invention, what I claim, and desire to secure by Letters Patent, is—

1. In a typographic machine, the combination of means for forwarding a line of matrices, and means for turning said matrices to different angles whereby they are adapted to be discharged into different magazines from a common distributing device.

2. In a typographic machine, the combination with a ribbed distributing-rail, of matrices having toothed notches, the notches in certain matrices being out of line with the notches in other matrices, and means for engaging all of said matrices with said distributing-rail.

3. In a typographic machine, the combination with a ribbed distributing-rail, of matrices having toothed notches, the notches in certain matrices being out of line with the notches in other matrices, means for forwarding a group of such matrices, and means for engaging all of said matrices with the distributing-rail.

4. In a typographic machine, the combination with matrices having toothed notches, the notches in certain matrices being out of line with the notches in other matrices, of means for forwarding a group of such matrices, and means for turning the matrices relatively to bring all the notches into alinement.

5. In a typographic machine, the combination with a plurality of series of matrices provided with V-shaped toothed notches, the notches in the different series being differently located with respect to the outlines of the matrices, of means for forwarding a group of such matrices, means for turning the matrices relatively to bring their notches into alinement, a common distributing-rail, and means for engaging the matrices with said distributing-rail.

6. In a typographic machine, the combination with matrices having toothed notches, the notches in certain matrices being out of line with the notches in other matrices when the matrix-bodies are alined, of means for forwarding a group of such matrices, and a turning device arranged to act upon the matrices as they are forwarded to cause the toothed notches to aline, whereby they may be charged upon a common distributing-rail.

7. In a distributing mechanism for a typographic machine, the combination with a plurality of magazines arranged with their entrance ends parallel and adjacent, of a single distributing-rail common to said magazines, and means for discharging matrices from said rail directly into the several channels of each of said magazines.

8. In a typographic machine, the combination with a plurality of magazines arranged with their entrance ends parallel and adjacent, a single distributing-rail, and a plurality of series of matrices provided with toothed notches adapted for engagement with said rail, the matrices of the different series having their notches differently located, whereby the different series of matrices are held in different positions by the distributing-rail and are adapted to be discharged into their respective magazines.

9. In a typographic machine, the combination with two magazines, of a common distributing-rail and two series of toothed matrices adapted to engage with said rail, the teeth in the matrices of the different series being differently arranged and being adapted to hold the matrices at different angles with respect to the rail, and a fixed guide beneath the rail in contact with which the lower ends of the matrices travel.

10. In a typographic machine, the combination with a plurality of magazines, of escapements for the matrices of the several magazines, and means extending between the paths of the outgoing matrices and connecting the corresponding escapements of the different magazines.

11. In a typographic machine, a plurality of magazines arranged with their delivery ends parallel and adjacent, a series of escapements for each magazine, and a series of rods extending between the paths of the outgoing matrices, each rod being adapted to operate the corresponding escapements of the several magazines, a keyboard, and connections between said keyboard and said rods.

12. In a typographic machine, the combination with a plurality of magazines arranged with their delivery ends parallel and adjacent, of a series of pivotally-mounted escapements for each magazine, a series of rods each extending transversely through the several magazines, connections between each of said rods and the corresponding escapements of the several magazines, and means controlled by the keyboard for reciprocating said rods.

13. In a typographic machine, the combination with a plurality of magazines, of escapements for the matrices of the several magazines, means extending through the magazines and connecting the corresponding escapements of the different magazines, and means for preventing the escape of matrices from either of said magazines.

14. In a typographic machine, the combination with a plurality of magazines, of escapements for the matrices of the several magazines, means extending through the magazines and connecting the corresponding escapements of the different magazines, and means adapted to engage alternately with the matrices in the several magazines to prevent the escape of said matrices.

15. In a typographic machine, the combination with a plurality of magazines, of escapements for the matrices of the several magazines, means extending through the magazines and connecting the corresponding escapements of the different magazines, and means to engage the lowest matrices in any magazine and move them upward to lock the matrices within said magazine and relieve its escapements from frictional contact therewith.

16. A device for distributing and releasing different sorts of matrices, comprising in combination with matrices having eccentric teeth or indents, a device for turning same singly, a distributing-rail, screws by which the different sorts of matrices are conveyed along at any desired angle on either side of the rail, magazines arranged one behind the other below the distributing-rail to receive said matrices, and releasing devices for the various sorts arranged in and between the magazines, and means for preventing more than one sort of matrix leaving a magazine at a time, all substantially as described.

17. The turning device for the matrices, comprising a guide having projections corresponding to the matrices located in a prolongation of the distributing-box, and upon which the matrices are pressed and in consequence of the ascent turned, so that the matrices, according as to whether the indents or teeth lie eccentrically right or left, after leaving the said prolongation of the distributing-box are pushed to the right or left hand side of the distributing-rail, substantially as described.

18. In a typographic machine, a releasing device for the matrices, comprising detents pivoted within the channels of the magazines and devices extending through the magazines and connecting corresponding detents, whereby on depressing a key the matrices bearing the letter corresponding to said key in each magazine are set free, and control devices located below the exit-openings of the channels for preventing any matrix from being released except those of the magazine set free by said control devices, substantially as described.

19. In a typographic machine, in combination with releasing devices comprising detents located within the magazine-channels, means extending through the magazines for operating said releasing devices, a device for controlling the exits of said channels, comprising a pivotal plate having projections and means for actuating same, said projections retreating the matrices for a short distance so that between the detent and the lugs of the matrices a space is formed and the detents relieved of the pressure of the matrices, substantially as described.

20. In a typographic machine, the combination with a plurality of magazines, of escapements for the several magazines, and means common to the several magazines and extending transversely of the magazines and arranged to operate the corresponding escapements of the different magazines.

21. In a typographic machine, the combination with a plurality of magazines arranged with their delivery ends parallel and adjacent and each provided with a series of escapements, of means common to the several magazines and extending transversely of the magazines and arranged to operate the corresponding escapements of the different magazines 22. In a typographic machine, the combination with a plurality of magazines arranged with their delivery ends parallel and adjacent and each provided with a plurality of escapements, of a plurality of escapement-operating devices, each device extending transversely of the several magazines and adapted to operate corresponding escapements of the several magazines.

HENRY B. BARTLETT.

Witnesses:

P. T. DODGE,

JOHN F. GEORGE.